United States Patent [19]
Wilson

[11] 4,382,189
[45] May 3, 1983

[54] HYDROGEN SUPPLEMENTED DIESEL ELECTRIC LOCOMOTIVE

[76] Inventor: John B. Wilson, 1008 Hanover Ct., Eldorado Hills, Calif. 95630

[21] Appl. No.: 262,051

[22] Filed: May 6, 1981

Related U.S. Application Data

[63] Continuation of Ser. No. 42,340, May 25, 1979.

[51] Int. Cl.$^3$ ............................................. F02B 51/04
[52] U.S. Cl. ......................................... 290/3; 290/45; 123/1 A
[58] Field of Search ...... 123/1 A, 3, 119 E, DIG. 12; 180/65; 188/159; 204/129; 290/3, 9, 16, 45; 318/367

[56] References Cited

U.S. PATENT DOCUMENTS

| | | | |
|---|---|---|---|
| 2,745,050 | 5/1956 | Johnson et al. | 318/367 |
| 3,648,668 | 3/1972 | Pacheco | 123/3 |
| 3,792,742 | 2/1974 | Mager | 180/65 F |
| 3,980,053 | 9/1976 | Horvath | 123/3 |
| 4,111,160 | 9/1978 | Talenti | 123/1 A |

Primary Examiner—David Smith, Jr.
Assistant Examiner—W. E. Duncanson, Jr.
Attorney, Agent, or Firm—Mark C. Jacobs

[57] ABSTRACT

A system is disclosed for using internally generated electricity as the power to OPERATE an electrolysis cell for the production of hydrogen gas. This hydrogen gas would be stored under pressure and used on demand as a fuel supplement as for hill ascension by a diesel locomotive.

9 Claims, 1 Drawing Figure

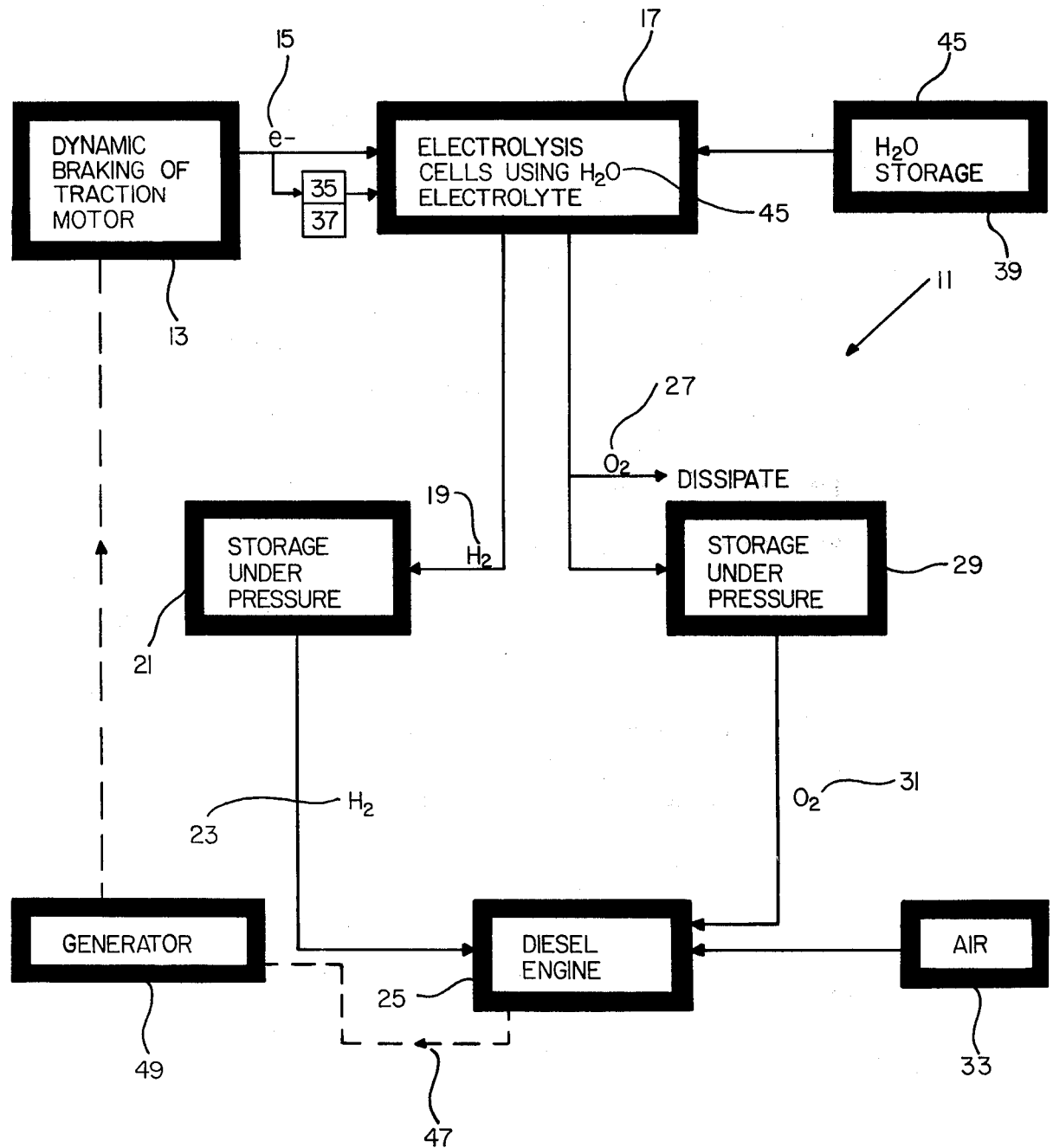
THE FIGURE

HYDROGEN SUPPLEMENTED DIESEL ELECTRIC LOCOMOTIVE

This is a continuation, of application Ser. No. 42,340, filed May 25, 1979.

FIELD OF THE INVENTION

This invention relates to prime movers of the type utilizing a diesel engine as the motivating energy and to the process of utilizing energy generated by the traction motors as the operating force for an electrolysis cell for the generation of hydrogen gas for use as a supplemental fuel for the diesel engine of a locomotive.

Heretofore numerous attempts have been made to supplement motive power for both automobiles and locomotives for use under extreme operating conditions as when ascending steep hills. Thus, Sugiyama in U.S. Pat. No. 3,886,810 employs available excess power from a prime mover in conjunction with a flywheel to power the prime mover when additional power is required. He discloses a control system for accomplishing the desired result.

Indeed, Tabor in U.S. Pat. No. 3,858,674 discloses the use of an electric motor flywheel system. This is but representative of what is known today as the state of the art.

It has long been a problem for the railroad industry to be able to provide sufficient motive power to ascend steep hills, such as in the Sierra Nevada mountains. Accordingly, it has been necessary to utilize 2, 3 or even more diesel engines to move long freight trains from the plateau from the Reno, Nevada area through the mountains to the Great Central Valley of California, which has an elevation of approximately 140 feet and vice versa. The Sierra Nevada mountains in northern California reach a maximum elevation of over 7000 feet.

In the journal Rail Classics, Vol. 6, No. 1 of January 1977 Escher Technology Associates proposed the use of hydrogen as the fuel for a diesel locomotive. It was stated that super-cold liquified hydrogen would be fed from a large insulated container in a specially designed tender to the locomotive where the hydrogen would be injected into the diesel engine conventional fashion. The proposal of Escher presupposes the presence of hydrogen gas in this specially designed tender car, which of course would be required to stand impace as well as normal operating temperature extremes due to weather.

It is an object of this invention therefore to provide a method and apparatus whereby hydrogen can be generated by electrolysis from water stored in a diesel electric locomotive, utilizing electricity generated on board the locomotive.

It is another object of the invention to utilize this generated hydrogen as a supplemental fuel for the diesel engine when ascending hills and for other difficult time of operation.

Another object is to provide a system for powering a locomotive which employs supplemental power that is generated during normal operating conditions and which is to be employed during extreme operating conditions.

Further objects will in part be obious and will in part appear hereinafter.

SUMMARY OF THE INVENTION

The foregoing objects and other features and advantages of the invention are attained by generating electricity from the excess energy available from dynamic brakes employed in diesel locomotives, which electricity is used in an electrolysis cell to separate water into its various gaseous components, namely hydrogen and oxygen. The hydrogen is stored for use during demand situations, at which time it is injected into the combustion chamber of the diesel locomotive, while the oxygen gas is either dissipated or in part stored for use in the combustion of the hydrogen and standard diesel fuel. Air may also be utilized to supplant or totally replace any oxygen not available from the storage facility on board for the oxidation reaction of combustion.

While not disclosed in detail, herein, it is recognized that the diesel electric locomotives upon which the invention is to be employed operate on the principle of the diesel fuel fired engine being operatively connected to a generator which generates power to operate traction motors.

BRIEF DESCRIPTION OF THE DRAWINGS

The FIGURE is a block diagram of the process of this invention.

DETAILED DESCRIPTION OF THE DRAWING

This invention is directed to a method of generating and supplying hydrogen gas as a fuel supplement to an internal combustion engine and in particular to a diesel locomotive engine. The invention further relates to the generation of the hydrogen by a fuel cell to serve as a supplemental fuel in the diesel engine. By supplementing the burning of a conventional fuel with hydrogen, the internal combustion is capable of producing more work when operating.

The method of generating the needed hydrogen is by the electrolysis of water. To enhance the electrolysis, a catalyst such as sodium hydroxide, potassium carbonate, may be added to the water electrolite. Preferably the hydrogen gas should be dried prior to pumping of same to a storage facility on board the locomotive or in a separate tender. Oxygen gas that is generated is either dissipated or stored for further utilization when needed. The rate of generation of the hydrogen and oxygen gases may be controlled by techniques known to the art.

Diesel locomotives that operate in mountainous regions generally are equipped with what are known to the art as dynamic brakes. Such brakes utilize the traction motors mounted on the driving axles of the locomotive as power generators. These are powered by the weight of the descending train. The resistance provided by the generation of electricity is the braking force keeping the train under control on the descent of downgrades. The amount of dynamic braking to be applied can be varied under the control of the engineer. Currently, the electricity from the dynamic brakes as is known to the art is passed through grids similar in construction, but larger than the grids used as resistance elements in electric toasters. Heat is dissipated to the atmosphere by the air circulation passing over the grids. It is seen therefore that a change of state from electrical energy to heat energy takes place. Oftimes supplemental fans are used to exhaust the heat.

In view of the fact that this electricity generated due to the weight of the descending train when it operates in mountainous terrains is totally wasted, it is indeed regretful that excess weight and cost are employed for the disposal of such electricity when in these troubled times it would be in the best interest of the railroad to utilize such self-generated electricity for useful work.

It is seen therefore that the instant invention is directed to a "battery" type system which utilizes this self-generated electricity as the basis for the electrolysis of self-contained water within the locomotive for the generation of hydrogen.

Turning to the FIGURE. It is seen that the traction motors 13, when the train is in downhill travel, give rise to electricity 15 which serves as the power needed for the electrolysis cells 17. Thus, in this first aspect of the system 11, it is to be seen that the exact amount of electricity as measured in direct current voltage would depend upon the incline of the grade being descended, the type of locomotive, the weight of the train, and of course, the design of the individual dynamic braking system. It is safe to say, however, that amperages in the neighborhood of 800 amps DC can be generated when traveling downgrade through the Sierra Nevada mountains of northern California.

The electricity 15 so generated may be employed directly in the electrolysis cells 17, or it may be utilized to charge a battery for the subsequent use of electricity if not required at the moment of generation. The concept of utilizing the momentum of a rail car or other basis for electricity for the storage of a battery on board the locomotive or railcar for subsequent use is shown in the U.S. Pat. of Pfeil, 723,727. Optionally, the battery 35 may comprise one or more storage batteries and may be used in conjunction with generators to partially recharge the bank of batteries when the engine is descending. Such a generator system is designated 37. For more details of such a combined battery generator regenerative power system for use in a vehicular enviroment, reference should be made to U.S. Pat. No. 3,972,380 to Hudson and Toby.

The electrolysis cell or cells 17 would include a housing having one or more partitions therein to define a multi-chamber of fuel cells. The cell is charged with an electrolite comprising water, alone or in combination with a catalyst, such as sodium hydroxide, potassium carbonate or other catalysts known to the art. Extending into the electrolite reservoir are a plurality of positive and negative electrodes. When the electrodes are energized, hydrogen and oxygen gas are liberated at the respective positive and negative electrodes. Hydrogen gas 19 generated in cells 17 may be stored under pressure in storage devices 21 for later use as hydrogen 23 in the combustion chamber of diesel engines 25. Reference is made to U.S. Pat. No. 4,031,865 issued to Patrick Dufour, which pertains to a hydrogen oxygen fuel cell for use with internal combustion engines. The fuel cell disclosed in that patent has direct utility in the invention of this application, and accordingly the disclosure of that patent is incorporated herein by reference.

The separation of the hydrogen gas 19 from oxygen 27 as generated by the electrolysis cells 17 is within the skill of the art. The oxygen gas 27 is allowed to dissipate into the atmosphere through suitable exhausting means, not shown, or it may be stored under pressure in storage tanks 29 for use during an ascending period of travel by the locomotive. The compression and storage of both hydrogen and oxygen is well known to the prior art.

When the locomotive 37, not seen in the drawing, requires further power for its diesel engine 25, as for pulling a heavy load up a steep incline, hydrogen 23 would be either mixed with conventional diesel fuel or injected directly into the cylinders to reduce the consumption of standard fuel by what is estimated to be between 10% and 15% of the fuel requirements of the engine. Such gas injection systems are known to the art today. Oxygen 31 could be pumped from storage vessels 29 for use in the combustion of both the conventional diesel fuel and the hydrogen. Supplemental air 33, which contains oxygen, can also be pumped into the combustion chamber, as is conventionally carried out.

It is seen that I have disclosed a total system that utilizes the electricity generated by the operation of dynamic braking of a locomotive as the power source for the operation of the electrolysis cells whereby hydrogen may be generated for use under difficult operating conditions of the locomotive.

It is to be seen that the invention contemplated herein may be employed on many different locomotives. The invention is primarily intended for utilization in North America due to the fact that most European countries have totally electrified their railroad systems. The most recent country undergoing electrification is the Soviet Union.

Typically, the engines capable of utilizing the invention of this application are the hood-type road switchers. An example of same that had the dynamic brake guides, which are dispensed with to carry out this invention, is the General Electric V36B. See "Trains", April 1979 at Page 24 to 29, which is incorporated herein by reference.

It is to be readily understood that for maximum safety the hydrogen that is transported should be transported at low pressure from the electrolysis unit to the storage vessel, at which place the compression for storage would transpire.

It is also within the scope of this invention to store the electricity 15, generated from the operation of the dynamic brakes, by operating a motor which is connected to a flywheel in order to achieve RPM of the flywheel. The motor is then operated in reverse to revert the kinetic energy of the flywheel back to electrical energy for use in the electrolysis cells 17.

While specifically disclosed with respect to a locomotive, if a dynamic type braking system can be made operative for trucks or other vehicles, the total system of this invention may be employed there as well.

While not specifically shown in the drawing, water to be employed as the electrolite would be pumped to the electrolysis cells 17 from any suitable location on the locomotive 37. Such pump mechanism and storage tanks are conventional in the art.

OPERATION

It is seen that in the normal operation of a diesel electric locomotive, that diesel engine 25 operating on diesel fuel, generates power, by driving a generator 49, which in turn sends power to the traction motors 13. The one or more traction motors mounted in the trucks of the locomotive act as the driving force. The axle of the wheels that are powered are connected by gearing to the motor 13's armature shaft.

When the train is descending a hill, a polarity switch is actuated such that the traction motor 13 instead of accepting electricity from the generator 49, actually generates electricity itself, which electricity is normally dissipated as heat. Here instead of dissipating the electricity as heat through grids (a principle referred to in the art as dynamic braking) the electricity 15, is utilized.

The broken line 47 represents the normal flow of power from the diesel engine to the generator to the traction motors. There is, as is known, no mechanical linkage between engine 25 and traction motors 13.

The lag time, if any, between the time of generation of the electricity for the electrolysis of the water 45 and the actual ability to split the water molecules, can be eliminated by having water 45 in the cells 17 awaiting electrolysis and by having hydrogen prepared, stored in tanks 21 as soon as it is made. Thus any hill that arises will have a supply of hydrogen waiting to be burned rather than relying on the timely immediate preparation of same for immediate usage.

The actual utilization of the hydrogen in so far as dosage per gallon of diesel fuel is at this stage of the advancement of technology either previously known or within the skill of the art to determine for a particular locomotive.

I claim:

1. A hydrogen supplementally fueled diesel powered locomotive comprising:
   (a) a conventional diesel electric locomotive having a diesel engine as its prime mover,
   (b) traction motors mounted in said locomotive adapted for dynamic braking of said locomotive and adapted to generate electricity when actuated,
   (c) at least one electrolysis cell for the electrolytic decomposition of water,
   (d) means coupled to said traction motors and to said, at least one, electrolysis cell to deliver electricity from said traction motors to said cell upon dynamic braking to generate hydrogen,
   (e) means for supplying generated hydrogen to said diesel engine as a fuel for said engine.

2. The locomotive of claim 1 including:
   (g) means for separately storing oxygen generated in said electrolysis cell.

3. The locomotive of claim 2 further including:
   (h) means for supplying stored oxygen to said diesel engine.

4. In the locomotive of claim 1 further including storage means for storing hydrogen generated in said at least one electrolysis cell.

5. The method of supplementing the power of a diesel electric locomotive for heavy local conditions, which comprises:
   (a) dynamically braking the locomotive upon descent of hills, to generate D.C. current;
   (b) energizing on electrolysis cell containing water to separate the water into $H_2$ and $O_2$, said cell being disposed in the locomotive or some other car of said train,
   (c) feeding the $H_2$ gas into the diesel engine of said locomotive.

6. The method of claim 5, further including storing the $H_2$ gas after the preparation thereof, prior to feeding the gas to the diesel engine.

7. The method of claim 5 including feeding at least a portion of the $O_2$ into the diesel engine.

8. The method of claim 7 further including the step of supplementing the $O_2$ with air for use in the diesel engine.

9. The method of claim 5 including the step of storing the $O_2$ after the preparation thereof.

* * * * *